United States Patent [19]
Otomo et al.

[11] Patent Number: 6,108,966
[45] Date of Patent: Aug. 29, 2000

[54] DEVICE FOR CATCHING FLYING INSECTS

[75] Inventors: Hitotaka Otomo; Hiroyuki Sato, both of Tokyo, Japan

[73] Assignee: Cats, Inc., Tokyo, Japan

[21] Appl. No.: 09/345,772

[22] Filed: Jul. 1, 1999

[30] Foreign Application Priority Data

Mar. 5, 1999 [JP] Japan .................................. 11-058640

[51] Int. Cl.⁷ .............................. A01M 1/04; A01M 1/14
[52] U.S. Cl. ................................................ 43/113; 43/114
[58] Field of Search ....................................... 43/112–114

[56] References Cited

U.S. PATENT DOCUMENTS

| | | | |
|---|---|---|---|
| 2,787,083 | 4/1957 | Jones | 43/113 |
| 2,835,071 | 5/1958 | Partridge | 43/112 |
| 3,473,251 | 10/1969 | Kahn | 43/112 |
| 3,685,198 | 8/1972 | Smith | 43/112 |
| 3,729,857 | 5/1973 | Giordano | 43/112 |
| 3,894,351 | 7/1975 | Iannini | 43/112 |
| 3,998,000 | 12/1976 | Gilbert | 43/112 |
| 4,074,457 | 2/1978 | Sato et al. | 43/113 |
| 4,127,961 | 12/1978 | Phillips | 43/113 |
| 4,182,069 | 1/1980 | De Yoreo | 43/112 |
| 4,332,100 | 6/1982 | Schneider | 43/113 |
| 4,454,677 | 6/1984 | Chuang | 43/112 |
| 4,490,937 | 1/1985 | Yavnieli | 43/113 |
| 4,876,822 | 10/1989 | White | 43/113 |
| 4,959,923 | 10/1990 | Aiello et al. | 43/112 |
| 5,203,816 | 4/1993 | Townsend | 43/114 |
| 5,255,468 | 10/1993 | Cheshire, Jr. | 43/113 |
| 5,274,949 | 1/1994 | Beaton | 43/113 |
| 5,425,197 | 6/1995 | Smith | 43/113 |
| 5,974,727 | 11/1999 | Gilbert | 43/113 |

FOREIGN PATENT DOCUMENTS

| | | | |
|---|---|---|---|
| 1024145 | 3/1966 | United Kingdom | 43/112 |
| 2171882 | 9/1986 | United Kingdom | 43/113 |
| 2275409 | 8/1994 | United Kingdom | 43/113 |

*Primary Examiner*—Michael J. Carone
*Assistant Examiner*—Darren W. Ark
*Attorney, Agent, or Firm*—Wenderoth, Lind & Ponack, L.L.P.

[57] ABSTRACT

The object of the invention is to provide a device for catching flying insects wherein an attracting rate of flying insects is increased by enlarging the diffusion area of light out of a case from the lamp for catching flying insects, and to prevent people from recognizing the flying insects caught in the case through the openings from below. The case is provided with at least vertical portions and slant portions extending from the vertical portions. The case has a polygonal cross-sectional shape having more than five sides. The device further includes a lamp for attracting flying insects, a member for catching the flying insects attracted by the lamp, openings formed in the vertical portions and slant portions, and a plurality of plates provided in the openings in the slant portions, the plates preventing recognition of the flying insects caught in the flying insect catching member.

15 Claims, 6 Drawing Sheets

DEVICE FOR CATCHING FLYING INSECTS

BACKGROUND

This invention relates to a device for catching flying insects, which attracts flying insects such as mosquitoes, flies, chrysomelids, moths and so on, and catches them with a catching member.

For exterminating flying insects such as mosquitoes, flies, chrysomelids, moths and so on which are not sanitary, it is effective to attract the flying insects by means of a lamp by making use of phototaxis of the flying insects and to catch the attracted flying insects with a catching member on which an adhesive member is provided. Such devices comprising the lamp for attracting flying insects and a catching member are already well-known as shown in Japanese Unexamined Patent Publications H9-205962 and H10-99001.

A device for detecting the flying insects shown in Japanese Unexamined Patent Publication H10-99001 is provided with a lamp for attracting the flying insects, a base on which the lamp for attracting the flying insects is provided, a clear casing attached on the lower side of the base, whose cross section view is approximately semicircular, a sheet for catching the flying insects located below the lamp, and an opening for invasion of the flying insects formed on the bottom of the casing.

A device for catching flying insects shown in Japanese Unexamined Patent Publication H9-205962 is such that a lamp for attracting the flying insects is provided in a frame for holding an adhesive member whose shape is approximately rectangular, and a receptacle for supporting a paper for catching the flying insects wherein the paper for catching the flying insects is provided on the bottom of the frame for holding the adhesive member. Large windows, each of which occupies the greater part of aside surface thereof, open at side surfaces along a long direction of the lamp in the frame. Also, large windows, each of which occupies the greater part of a surface thereof open at side surfaces perpendicular to the long direction.

However, in the former device for detecting the flying insects, because the opening for invasion is only provided in a bottom of a casing and other parts of the casing are blocked, it has the disadvantage that the attracting efficiency is low because an area through which the flying insects invade is limited. Furthermore, it has the disadvantage that no light of the lamp reaches above the device because the lamp for attracting is attached on the base positioned at an upper side of the device. In the reference device, because the casing is formed clearly and the invasion opening is formed in the bottom of the device, the flying insects caught in the device may be seen from below. Thus, when the device for detecting flying insects is located at a high place in a shop such as a restaurant, customers can see the flying insects in the device for detecting flying insects and may thus have the impression that the shop is unsanitary and, as a result, the shop may suffer a remarkable disadvantage in business.

In the latter device for catching flying insects, the total area of the openings in this device is larger than that of the former device, but because the receptacle for supporting the catching paper is provided on the bottom and an attachment for disposing the lamp for attracting flying insects is provided above the receptacle, it is difficult to form any windows in an upper portion and a bottom portion of the frame for supporting the adhesive member, so that it has the disadvantage that the windows through which the light is radiated are limited in vertical dimensions and the diffusion area of the light is not sufficient.

Against this disadvantage, in order to enlarge the total area of the openings to enlarge the area where the light is radiated, it is considered that a case of a device for catching flying insects is made with a polygonal cross-sectional shape having more than five sides, and openings are formed in vertical portions and slant portions slanted relative to the vertical portions. However, in the case that the openings are formed in the lower slant portions and the device is positioned at a high place in a restaurant, the flying insects caught in the device may be seen through the openings to give customers a bad feeling as with the former device for detecting flying insects.

SUMMARY OF THE INVENTION

The object of this invention is to provide a device for catching flying insects to increase an attracting rate of flying insects by enlarging the diffusion area of light out of a case from the lamp for catching flying insects, and to prevent people from recognizing the flying insects caught in the case through the openings from below.

Accordingly, a device for catching flying insects according to this invention comprises a case provided with at least vertical portions extending along a longitudinal direction thereof and slant portions extending from the vertical portions and slanted relative to the vertical portions. The case has a polygonal cross-sectional shape having more than five sides. The device further includes a lamp for attracting flying insects provided in the case; a member for catching the flying insects attracted by the lamp; openings formed in the vertical portions and the slant portions, the flying insects invading into the case through the openings; and a plurality of plates (i.e. blinder plates) provided in the openings in the slant portions extending from lower ends of the vertical portions, the plates preventing recognition of the flying insects caught in the flying insect catching member. Note that each of the plurality of the plates is slanted so that an upper portion of the plate is positioned outward from the lower portion of the plate.

Furthermore, the case is provided with a pair of vertical portions, a pair of upper slant portions extending from upper edges of the pair of the vertical portions and slanted relative to the vertical portions, a pair of lower slant portions extending from lower edges of the pair of the vertical portions and slanted relative to the vertical portions, an upper portion extending between the pair of the upper slant portions, and a bottom portion extending between the pair of the lower slant portions. In this form the case is formed with an octagonal cross-sectional shape, wherein the openings are formed in the pair of the vertical portions, the pair of the upper slant portions and the pair of the lower slant portions, and the plurality of the plates are provided in the openings formed in the lower slant portions. Moreover, in the device, the member for catching flying insects is a sheet having at least an adhesive member disposed in an upper portion.

Thus, as the case is formed in a polygon shape with more than five sides and the openings are formed in the vertical portions and the slant portions slanted relative to the vertical portions, the total area of the openings of the device becomes large and an angle of light radiated from the lamp becomes wide. Besides, the openings formed in the slant portions extending from lower edges of the vertical portions are divided into a plurality of slits by a plurality of the plates, but light may be radiated through the plurality of slits and the plates may prevent the flying insects caught in the device from being seen from below. Accordingly, when the device for catching flying insects is located at a high place, the flying insects caught in the device may not be seen.

Also, it is preferred that a plurality of openings are provided in both end surfaces in a longitudinal direction of the case. Thus, the total opening area of the device for catching flying insects becomes larger and an area where light is radiated becomes wider too.

BRIEF DESCRIPTION OF THE DRAWINGS

Further objections and advantages of the invention can be more fully understood from the following detailed description taken in conjunction with the accompanying drawings in which.

DESCRIPTION OF THE PREFERRED EMBODIMENT

Figure 1:
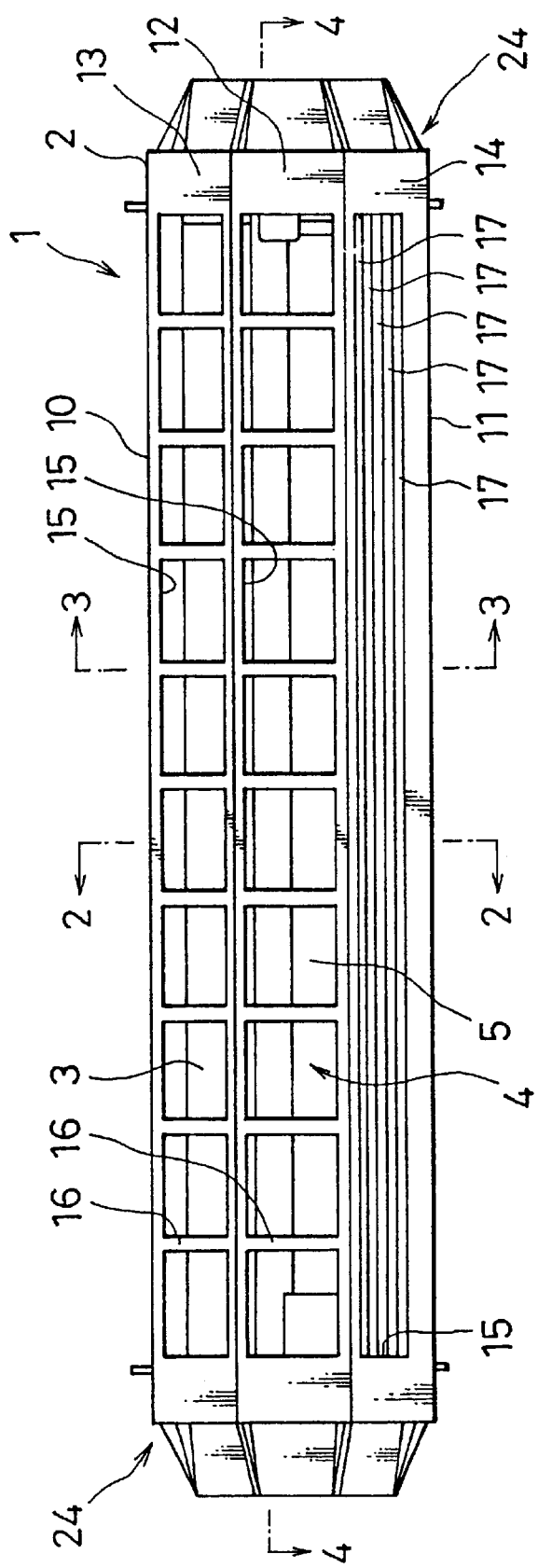
FIG. 1 is a front view illustrating a device for catching flying insects according to the present invention.
Figure 2:
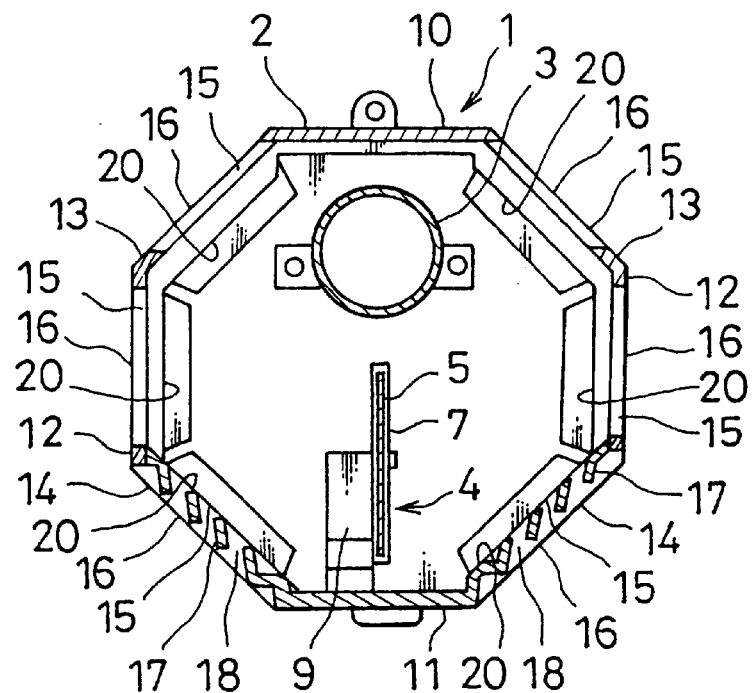
FIG. 2 is an enlarged cross section view taken along the line 2—2 of FIG. 1.

The preferred embodiment according to the present invention is explained by referring to the drawings as follows.

The most preferred embodiment of a device for catching flying insects 1 is shown in FIGS. 1 through 7. The device 1 is constituted of at least a case 2, a lamp 3 for attracting flying insects positioned inside the case 2 and a member 4 for catching flying insects located adjacent to the lamp 3.

The lamp 3 is a well-known fluorescent light which radiates light in an ultra-violet area where an effect of attracting flying insects arises. This lamp 3 is removably attached in sockets (not illustrated in the figures).

The member 4 for catching flying insects is preferably located adjacent and below the lamp 3 for attracting flying insects.

In this embodiment, the member 4 for catching flying insects comprises a sheet 5 for catching insects, a box 6 housing the sheet 5 and a fixing pull 7 mounted on a front end of the sheet 5. Thus, the box 6 is attached on a fixing frame 8 provided on an inner surface of one end of a bottom portion 11 in the case 2, the fixing pull 7 is pulled to pull the sheet 5 out of the box 6 to another end of the bottom portion 11, and then the fixing pull 7 is hooked on a hook portion 9 mounted on the another end of the bottom portion 11 in the case 2, so that the member 4 for catching insects can be attached on the case 2. An adhesive member is applied or stuck on both surfaces of the sheet 5 and flying insects such as mosquitoes, flies, chrysomelids, moths and so on can be caught by the adhesive member.

The case 2 is an approximately elongated octagonal prism whose side surfaces comprise an upper portion 10 extending in a horizontal direction, the bottom portion 11 extending in parallel with the upper portion 10, a pair of vertical portions 12 positioned perpendicular to the upper portion 10 and the bottom portion 11, a pair of upper slant portions 13 extending between the upper portion 10 and the vertical portions 12, and a pair of lower slant portions 14 extending between the bottom portion 11 and the vertical portions 12.

In bases 24 of the octagonal prism positioned at both longitudinal ends of the device 1, projecting portions 19 formed smaller than the base 24 of the octagonal prism are projected outward in an axial direction of the octagonal prism, and approximately trapezoidal openings 20 are provided in portions except an upper portion and a lower portion around each of the projecting portions 19. Thus, because the total area of openings 15, 20 becomes large so that radiation area of light becomes great, an effect for catching insects may be increased.

Figure 3:
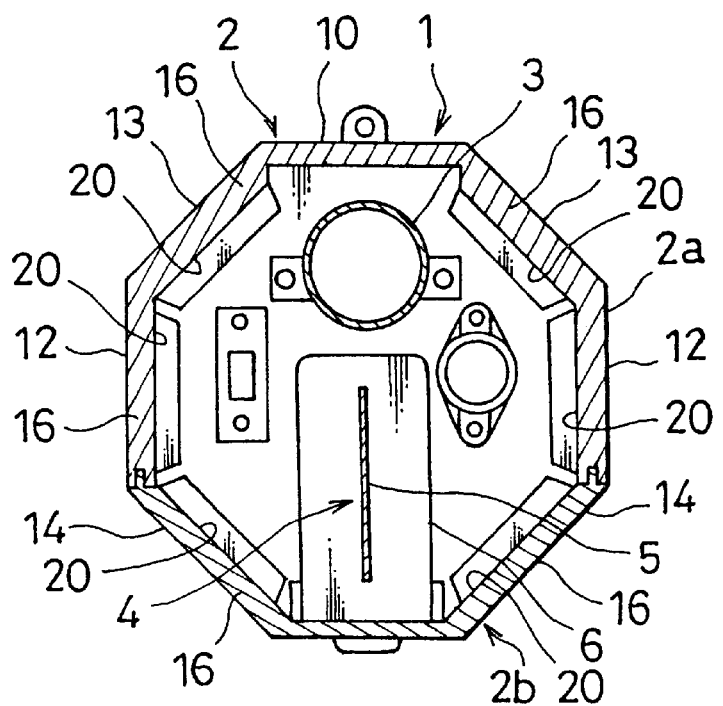
FIG. 3 is an enlarged cross section view taken along the line 3—3 of FIG. 1.
Figure 4:
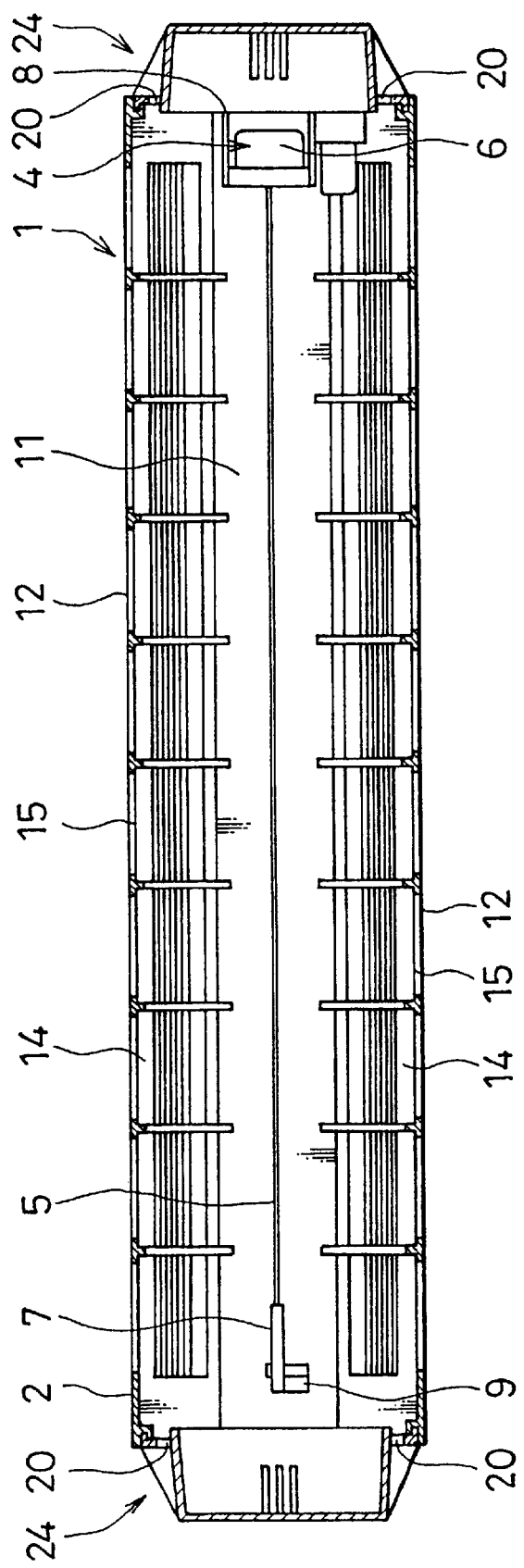
FIG. 4 is a cross section view taken along the line 4—4.

The case 2, as shown in FIG. 3, can be separated into an upper case 2a and a lower case 2b, the upper case 2a comprising the upper portion 10, the upper slant portions 13 and the vertical portion 12, the lower case 2b comprising the bottom portion 11 and the lower slant portions 14, so that the upper case 2a is removable from the lower case 2b in order to make work in the case 2 easy.

Furthermore, openings 15 for radiating light of the lamp 3 out of the case 2 and for allowing the flying insects to invade are formed to be as large as possible in the upper slant portions 13, the vertical portions 12 and the lower slant portions 14, respectively. Furthermore, each opening 15 is provided with at least one supporter 16 (nine supports in the present preferred embodiment) extending in a short direction of the openings 15 at regular intervals in a longitudinal direction of the openings 15 to increase the strength of the case 2.

Figure 5:
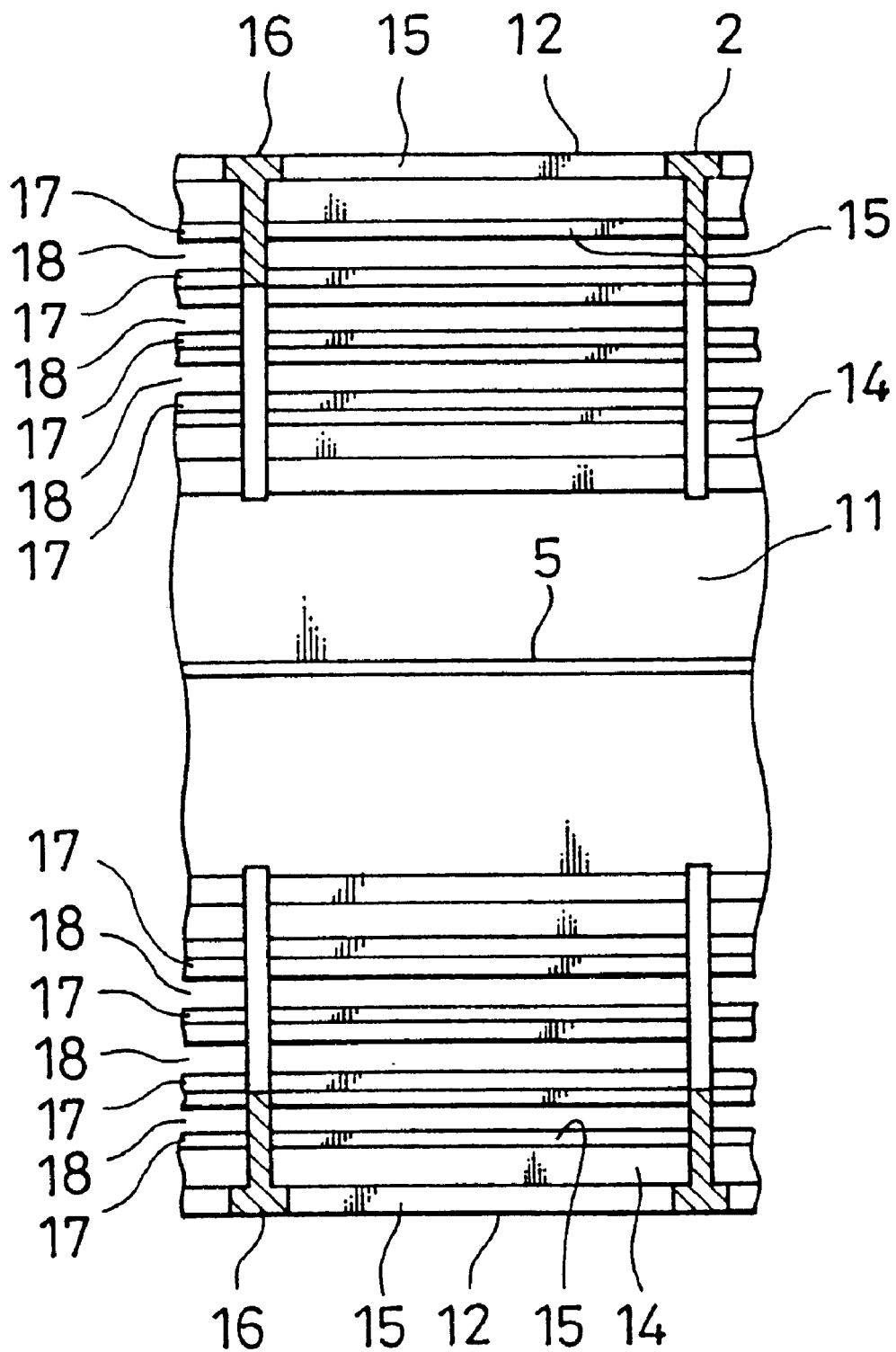
FIG. 5 is an enlarged partly diagrammatic section view of a lower portion of the device for catching flying insects.
Figure 6:
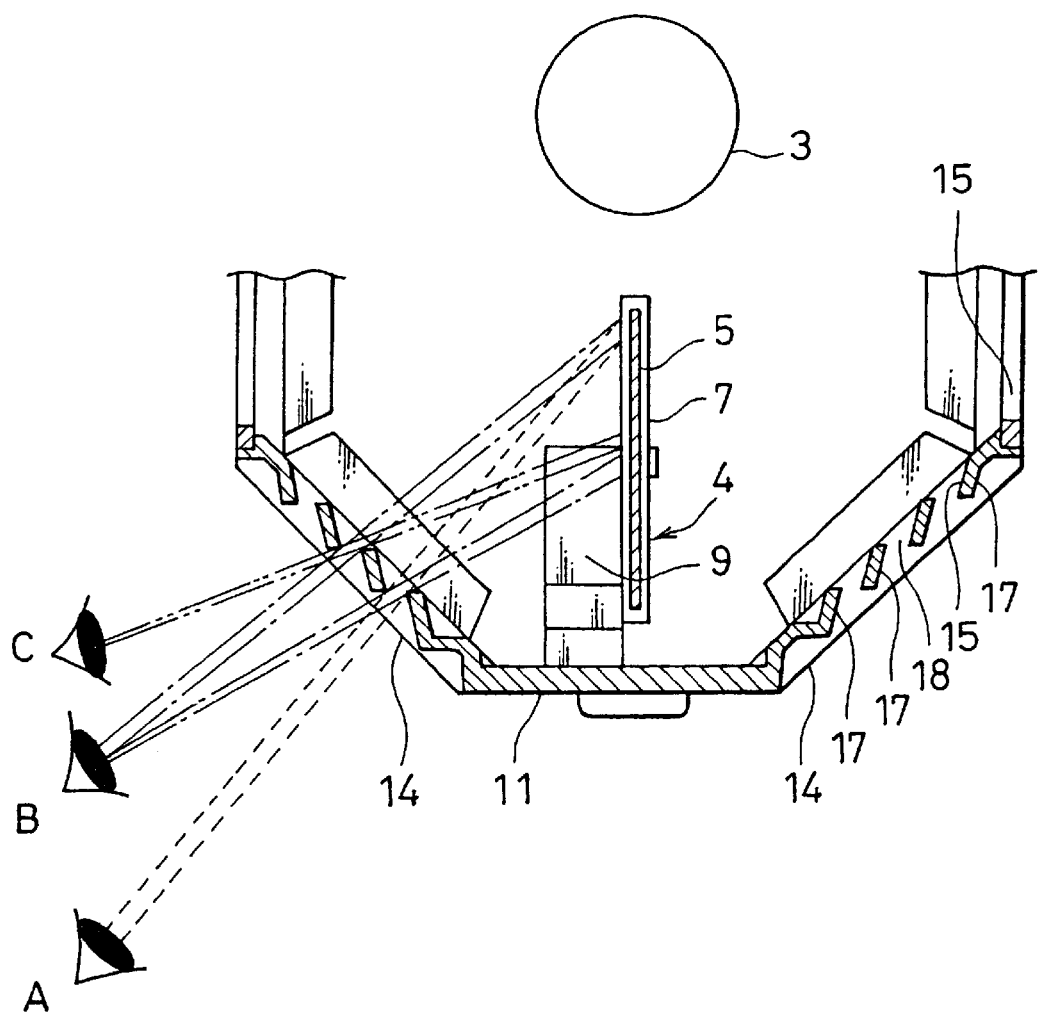
FIG. 6 is a partly diagrammatic section view illustrating the device as seen from below.
Figure 7:
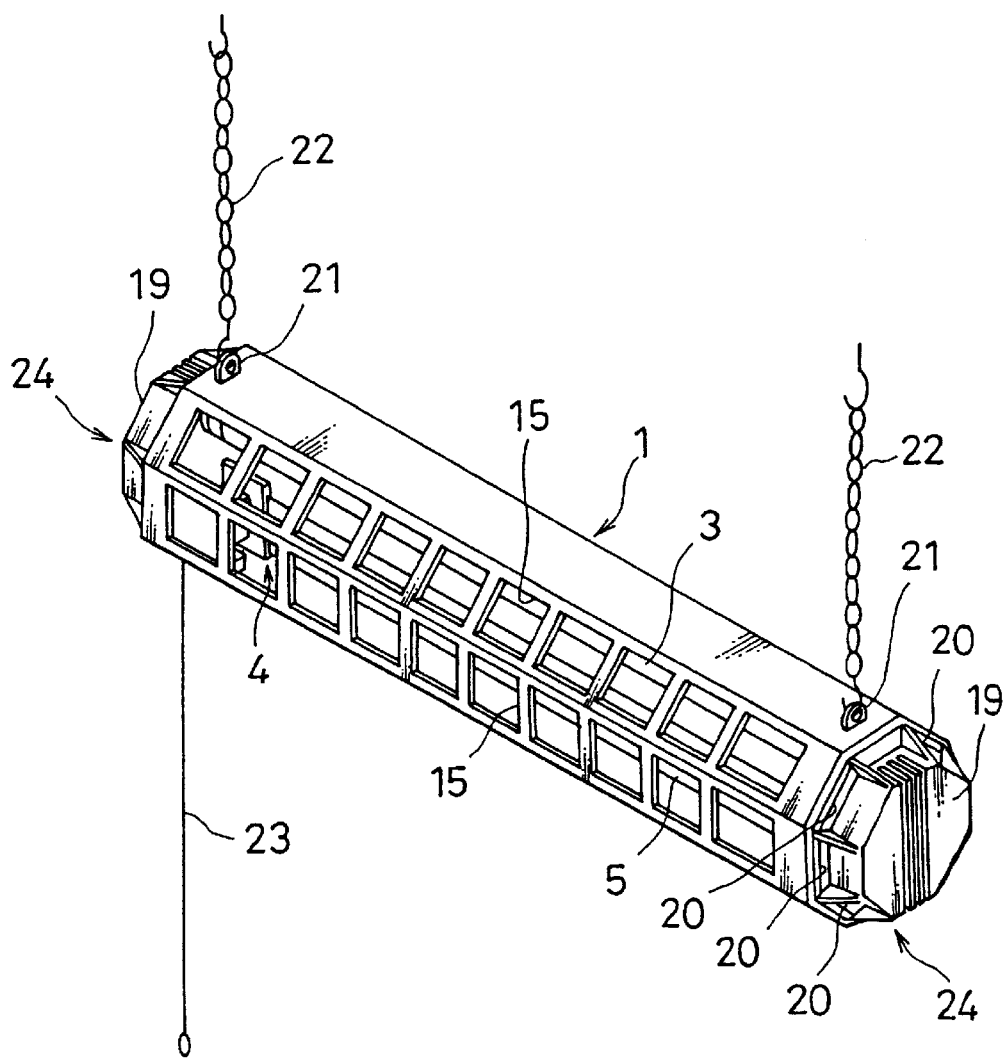
FIG. 7 is a perspective view illustrating a condition in which the device is used.

Also, each of the openings 15 formed in the lower slant portions 14 is provided with a plurality of blinder plates 17 (four plates including both side plates in the present preferred embodiment) in parallel with one another at regular intervals in a short direction of the opening 15 to divide the opening 15 into a plurality of slits 18 as shown in FIG. 5.

Each of the plates 17 is slightly slanted so as to position an upper portion of the plate 17 outward of a lower portion of the plate 17 in the case 2 to screen the flying insects caught by the flying insect catching member 4 from peoples' view. Furthermore, in adjacent plates 17, an upper edge of one plate located lower than another plate and a lower edge of another plate located higher than the one plate are aligned or arranged so as to overlap each other in the vertical direction.

According to the above constitution, because the device 1 for catching flying insects of the present invention is such that the openings 15 are provided with the upper slant portions 13, the lower slant portions 14 and the vertical portions 12, when compared with an approximately rectangular-shaped device for catching flying insects which has dimensions of a long direction and a short direction the same as the device of the present invention, the device 1 of the present invention has about 1.4 times the total area of openings of the rectangular device. Furthermore, light of the lamp 3 is radiated widely from the case 2 through the openings 15 formed in the upper slant portions 13, the openings 15 formed in the vertical portions 12 and the openings 15 of the lower slant portions 14. Thus, the radiation area of the light in the device 1 according to the present invention may be enlarged. Furthermore, the device 1 has openings 20 in each base 24 to further enlarge the diffusion area.

When the device 1 is seen in a horizontal direction, the inside of the case 2 is screened by the plates 17 provided in the openings 5 of the lower slant portion 16. When the device 1 is seen from just below, the sheet 5 of the member 4 can not be seen because it is located near the bottom portion 11. When the device 1 is seen from below, for instance, when the device 1 is seen from a position A shown in FIG. 6, the view is shown by broken lines and has an extent such that only an upper side portion of the sheet 5 is seen through the slits 18 between the plates 17, so that the flying insects caught in the sheet 5 can not be recognized clearly. When the device 1 is seen from a position B shown in FIG. 6, the view is shown by alternate long and short dash lines and has an extent such that only an upper side portion and a middle portion are seen through the slits 18 between the plates 17, so that the flying insects caught in the sheet 5 can not be recognized clearly. Furthermore, when the device 1 is seen from a, position C shown in FIG. 6, the view is shown by alternate long and two short dashes lines and has an extent such that only a middle portion is seen through the slits 18 between the plates 17, so that the flying insects caught in the sheet 5 can not be recognized. However, light of the lamp 3 under the device 1 can be gained thoroughly because the light is radiated via slits 18 between the plates 17.

A pair of hanging portions 21 with holes are provided in the upper portion 10 of the case 2 and hooks of chain-like hanging members 22 hung down from a ceiling are hung on the hole of the hanging portions 21, so that the device 1 can be set at a high place. Furthermore, the lamp 3 is turned on or turned off by pulling a switching rope 23.

As above-mentioned, according to the present invention, the case of the device for catching flying insects is formed with a polygon cross section having more than five sides, and the openings are formed in the vertical portions, the upper slant portions and the lower slant portions to enlarge the total area of the openings in the device, and such that the radiation area of the light becomes large to increase an attracting rate of the flying insects. Furthermore, because a plurality of the plates are arranged in the openings formed in the lower slant portions, respectively, and the view from below is screened by the plates, the flying insects caught by the flying insect catching member cannot be recognized when the device is located at a high place.

Moreover, according to the present invention, a plurality of openings are provided in both end portions to enlarge the total area of the openings and to enlarge the radiation area of the light, so that an attracting rate of the flying insects can be further increased.

Although the invention has been described in its preferred form with a certain degree of particularity, it is understood that the present disclosure of the preferred form can been changed in the details of construction and the combination and arrangement of parts without departing from the spirit and the scope of the invention as hereinafter claimed.

What is claimed is:

1. A device for catching flying insects, comprising:
   an elongated case having, a polygonal cross-sectional shape having a plurality of straight sides;
   a lamp provided in said case for attracting flying insects;
   a flying insect catching member provided in said case;
   wherein said plurality of straight sides of said polygonal cross-sectional shape includes a pair of vertical sides, and a pair of lower slant sides extending downwardly from said vertical sides, respectively, and slanted relative to said vertical sides so as to face in directions downwardly and outwardly of said case;
   wherein each of said vertical and lower slant sides is elongated longitudinally of said case;
   wherein an insect-invasion opening is formed in each of said vertical and lower slant sides; and
   wherein a plurality of spaced apart blinder plates are provided in each of said openings formed in said lower slant sides to prevent viewing of flying insects caught by said flying insect catching member from below said case but to allow insects to fly into said case through gaps between said blinder plates.

2. A device for catching flying insects according to claim 1, wherein
   for each of said openings of said lower slant sides, said blinder plates are slanted relative to said vertical sides so as to face downwardly and outwardly of said case.

3. A device for catching flying insects according to claim 2, wherein
   for each of said openings of said lower slant sides, each of said blinder plates vertically overlaps a portion of an adjacent one of said blinder plates.

4. A device for catching flying insects according to claim 2, wherein
   said polygonal cross-sectional shape comprises an octagonal cross-sectional shape.

5. A device for catching flying insects according to claim 2, wherein
   said plurality of straight sides of said polygonal cross-sectional shape further includes a pair of upper slant sides extending upwardly from said vertical sides, respectively, and slanted relative to said vertical sides so as to face in directions upwardly and outwardly of said case, a horizontal top side extending between upper ends of said upper slant sides, and a horizontal bottom side parallel to said top side and extending between bottom ends of said lower slant sides; and
   each of said upper slant sides, and said top and bottom sides is elongated longitudinally of said case.

6. A device for catching flying insects according to claim 2, wherein
   said case further includes a pair of end surface portions provided at longitudinally opposing ends of said case.

7. A device for catching flying insects according to claim 6, wherein
   each of said end surface portions has a plurality of openings formed at intervals about a peripheral edge thereof.

8. A device for catching flying insects according to claim 2, wherein
   said blinder plates and said flying insect catching member are arranged relative to said case so that the gaps between said blinder plates appear narrower than an actual width of said gaps, when viewed along lines which respectively extend through the insect-invasion openings of said lower slant sides and intersect with said flying insect catching member.

9. A device for catching flying insects according to claim 1, wherein
   for each of said openings of said lower slant sides, said blinder plates are slanted relative to said vertical sides by a slant amount which is less than a slant amount by which said lower slant sides are slanted relative to said vertical sides, respectively.

10. A device for catching flying insects according to claim 9, wherein
    for each of said openings of said lower slant sides, each of said blinder plates vertically overlaps a portion of an adjacent one of said blinder plates.

11. A device for catching flying insects according to claim 1, wherein said polygonal cross-sectional shape comprises an octagonal cross-sectional shape.

12. A device for catching flying insects according to claim 1, wherein said plurality of straight sides of said polygonal cross-sectional shape further includes a pair of upper slant sides extending upwardly from said vertical sides, respectively, and slanted relative to said vertical sides so as to face in directions upwardly and outwardly of said case, a horizontal top side extending between upper ends of said upper slant sides, and a horizontal bottom side parallel to said top side and extending between bottom ends of said lower slant sides; and each of said upper slant sides, and said top and bottom sides is elongated longitudinally of said case.

13. A device for catching flying insects according to claim 1, wherein said case further includes a pair of end surface portions provided at longitudinally opposing ends of said case.

14. A device for catching flying insects according to claim 13, wherein each of said end surface portions has a plurality of openings formed at intervals about a peripheral edge thereof.

15. A device for catching flying insects according to claim 1, wherein said blinder plates and said flying insect catching member are arranged relative to said case so that the gaps between said blinder plates appear narrower than an actual width of said gaps, when viewed along lines which respectively extend through the insect-invasion openings of said lower slant sides and intersect with said flying insect catching member.

* * * * *